Dec. 23, 1958
A. E. BISHOP
2,865,217
VARIABLE RATIO STEERING GEAR
Filed May 27, 1955
2 Sheets-Sheet 1
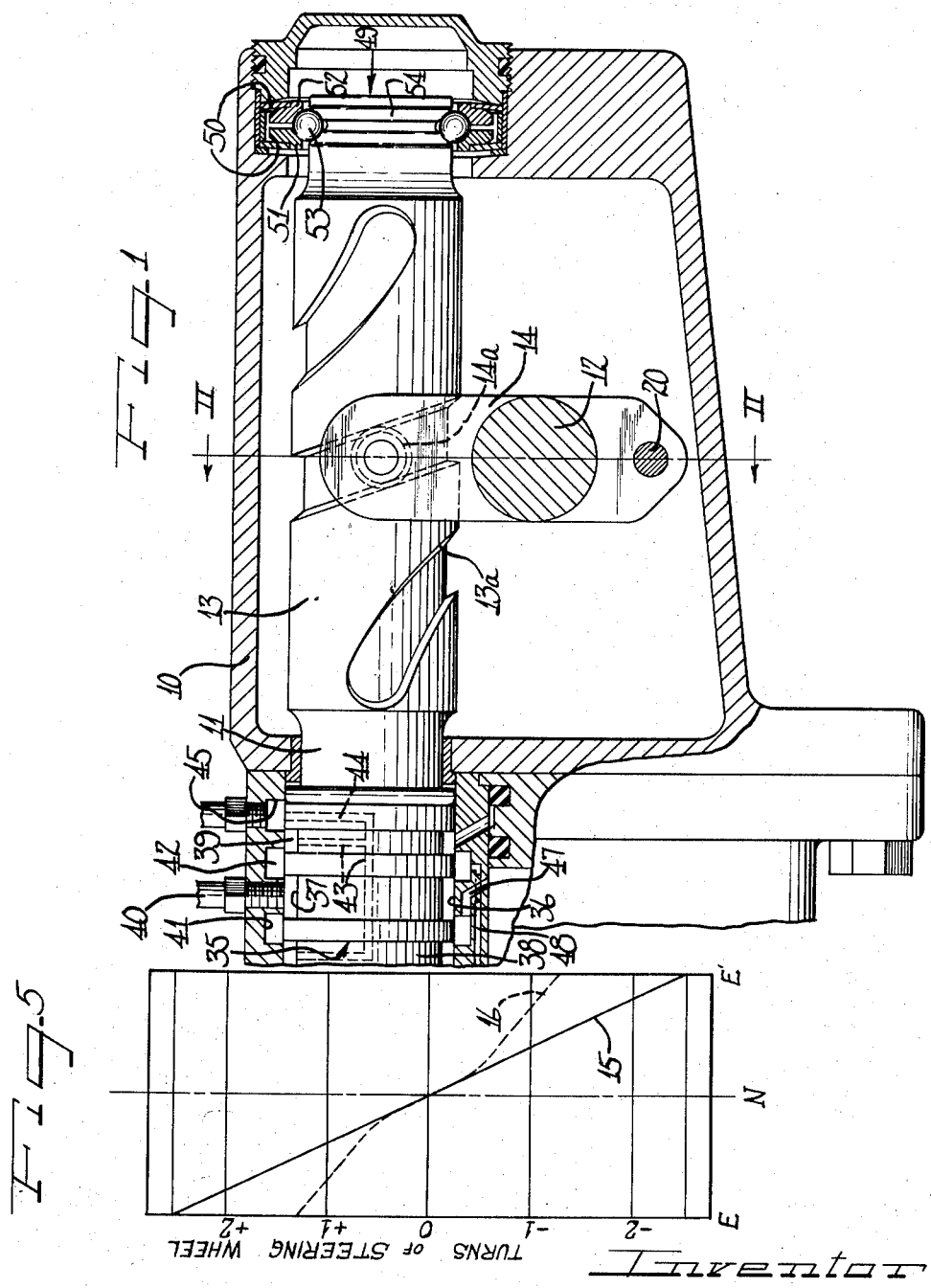
Inventor
Arthur E. Bishop Dec. 23, 1958  A. E. BISHOP  2,865,217
VARIABLE RATIO STEERING GEAR
Filed May 27, 1955  2 Sheets-Sheet 2
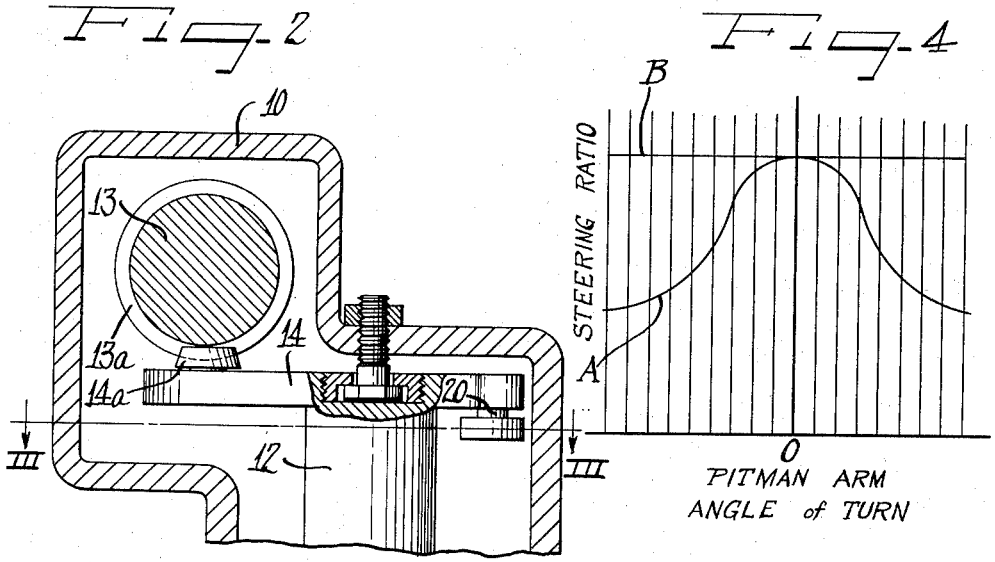
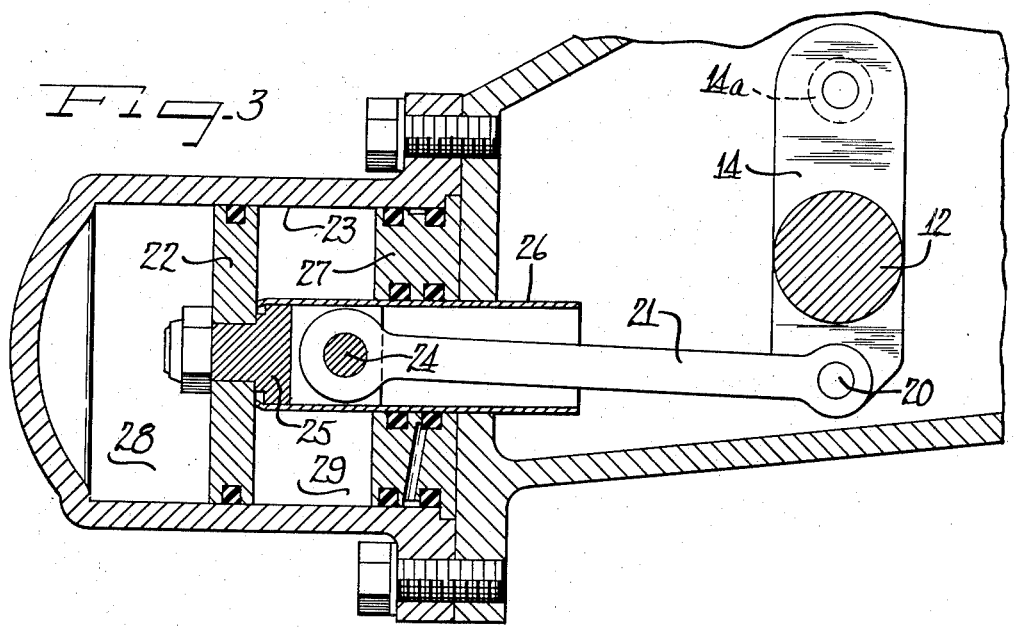
Inventor
Arthur E. Bishop

United States Patent Office 2,865,217
Patented Dec. 23, 1958

2,865,217

VARIABLE RATIO STEERING GEAR

Arthur E. Bishop, Chatswood, near Sydney, New South Wales, Australia

Application May 27, 1955, Serial No. 511,541

Claims priority, application Australia June 1, 1954

4 Claims. (Cl. 74—388)

The present invention relates to steering apparatus for vehicles and is, more particularly, concerned with the construction of a new and improved steering gear providing power boost in combination with a reduced steering ratio under conditions of large steering deflections.

As is well known in the automotive art, the use of power steering for conventional motor vehicles has greatly increased in recent years. As a result of modern developments, power assisted steering is now commonplace in automotive vehicles of the passenger type. The addition of such power apparatus to the passenger type of vehicle has not only resulted from a desire on the part of purchasers to own power equipment, but also upon the fact that modern extremely low pressure tires and modern steering geometry have caused the steering loads of the new passenger vehicles to increase substantially.

Numerous ways have been devised in the prior art for providing a power boost in the steering linkage. However, these proposed systems have not been entirely satisfactory. One of the major points of dissatisfaction with the present day power steering apparatuses is the fact that in most passenger vehicles being sold with power steering, the steering ratio utilized with the power steering apparatus is substantially the same as that used in manual steering systems. Thus, in spite of the fact that a power steering motor is capable of supplying the large torque requirements of modern steering linkages at a much lower steering ratio than ordinarily used in passenger vehicles, the steering ratios used in connection with such vehicles for many years have been retained. Fundamentally, this retention is the result of the inability of the average vehicle operator to adapt himself surely to the relatively rapid steering action inherent in steering systems having low ratios. Thus, although some vehicles have been constructed utilizing a small power steering ratio, accidents have been traced to an oversteering condition in which the vehicle operator has rapidly turned the steering wheel in an effort to obtain a relatively minor steering deflection at high speeds, and has as a consequence, driven the car completely off the road.

In view of the above difficulties encountered with prior power steering devices utilizing a relatively low steering ratio, additional development work has been undertaken in the field to obtain an improved power steering apparatus. In accordance with the present invention, an improved apparatus is provided in which the power steering action, or power boost, is applied to the vehicle steered wheels through a power steering ratio of conventional magnitude, such as for example 23 to 1, at all times when the vehicle is at or near the straight ahead position. However, as the vehicle is turned through greater and greater degrees of steering deflection, such as for example during parking operations or when turning a sharp low speed turn, the steering ratio drops to approximately 8 to 1, thereby permitting the vehicle operator to turn the steering system from lock to lock with a minimum number of turns. As a result of the apparatus of the present invention, the vehicle operator may turn the vehicle from an extreme left hand to an extreme right hand turn condition with a minimum number of turns of the steering wheel, thereby greatly simplifying jobs such as parking. At the same time that this advantage is obtained, however, the disadvantage ordinarily attributed to such performance, i. e., oversteering conidtions at high speed, straight ahead driving conditions, are not encountered.

In accordance with the present invention, a steering reduction gearing unit of the cam and cam follower type is provided. However, instead of utilizing a cam of a substantially constant lead, as in prior art devices, the cam is provided with a cam groove having a lead which increases as the steering wheel is turned from its neutral, straight ahead condition. Power is applied to the steering system at the output end of the steering column, preferably at the steering gear cross shaft, or directly to the drag link, and operates independently of the steering ratio to provide sufficient power boost to turn the vehicle under any and all conditions.

It is, therefore, an object of the present invention to provide a novel power steering system providing a progressively increasing steering ratio as the steered wheels are deflected from their neutral, straight ahead positions.

Another object of the present invention is to provide a simple, yet highly effective, power steering system of the cam and cam follower type.

Yet another object of the present invention is to provide a novel and improved power steering system wherein a high steering ratio is provided in the straight ahead condition and a progressively lower steering ratio is effected as the vehicle is turned to an increasing degree.

A feature of the invention is the provision of a variable lead steering cam cooperating with a cam follower directly associated with the steerable wheels of the vehicle.

Another feature of the invention is a power steering control for vehicles or the like in which the steering shaft is mounted for slight reciprocation and is provided with a variable lead cam slot in the peripheral surface thereof by which rotation of the steering wheel is transferred to the steerable wheels with a substantial reduction in ratio toward the extreme directions of turn.

Still other and further objects and features of the present invention will at once become apparent to those skilled in the art from a consideration of the attached drawings wherein a preferred form of the invention is shown by way of illustration only, and wherein:

Figure 1 is a plan view in partial cross-section of a steering column embodying the present invention;

Figure 2 is a cross-sectional view of the steering column shown in Figure 1 and taken along the line II—II of that figure;

Figure 3 is a cross-sectional view taken along the line III—III of Figure 2;

Figure 4 is a graph illustrating the operation of the invention as herein shown and described; and Figure 5 is a chart indicating the development of the cam utilized in accordance with the present invention.

As shown on the drawings:

As may be seen from a consideration of Figures 1, 2 and 3, the apparatus of the present invention is housed within a steering column housing 10 carrying a steering wheel shaft 11 positioned longitudinally therein. The shaft 11 is drivingly connected to an output or cross shaft 12 by means of the cam and slot connection comprising a cam groove 13a in the cam 13 and a roller cam follower 14a connected to the cross shaft 12 by means of a rigid arm 14.

While it is, of course, known in the power steering art, as well as in the manual steering art, that cam and cam follower type steering reduction gearing provides a satisfactory steering apparatus, prior art systems have utilized a cam slot 13a having a substantially uniform lead. In fact, in prior art cam and cam follower types of steering reduction with which I am familiar slight compensation has been made in the shape of the cam slot to provide substantially constant steering ratio throughout the entire range of steering actuation. Thus, in the ordinary, prior art, systems utilizing a cam groove with a cam follower riding in the groove, the lead of the groove would increase slightly toward its ends in order to prevent the steering ratio from increasing as the cross shaft 12 approaches a maximum point of oscillation. In the present invention, however, a very substantial deformation is given the cam groove 13a to more than compensate for the change in ratio that would automatically occur as a result of the oscillation of the cross shaft 12 and the corresponding change in effective lever arm. In the present construction, the slot is very sharply increased in lead so that the effective steering ratio is substantially reduced toward the extremities of oscillation of the cross shaft 12.

A graph of the change in lead of the slot 13a, as compared with a conventional constant lead slot is shown in Figure 5. As may there be seen, the constant lead is illustrated at line 15 plotted from the neutral position N to extreme positions E and E' which would comprise the total operative length of the cam slot. As may be seen from the graph, movement from the point E to the point E' requires approximately five turns of the steering wheel or, approximately two and one-half turns from the neutral position to either of the extreme or "lock" positions. The development of the cam slot 13a utilized in accordance with the present invention may be seen at line 16, which line is substantially identical to line 15 adjacent the neutral condition. As the steering wheel is rotated, and the cross shaft 12 is oscillated to an increasing degree, the slot 13a, represented by the line 16, turns sharply away from the straight line 15, reaching the extreme position E or E' after only approximately one and one-third turns from the central condition. It will thus be appreciated that under the arrangement herein proposed only approximately two and two-thirds turns of the steering wheel are necessary to turn the vehicle from its extreme left to its extreme right turn conditions thereby giving the vehicle operator a variety of control which permits less abrupt changes in direction at and adjacent the neutral or straight ahead steering condition and at the same time allows parking operations to be accomplished with the very minimum of steering wheel turn.

It will, of course, be apparent that the variation in the steering ratio above described, and the operation of which is illustrated in Figure 5, is entirely unsuited to manual steering actuation. As those familiar with automotive vehicles are aware, the steering operations requiring the most effort are those in which the vehicle is either at a standstill or traveling at a nominal rate of speed such as in parking or sharp cornering conditions. With the vehicle in such conditions, substantial amounts of manual effort are required to turn the wheels even where the steering ratios are large, as in conventional constant ratio steering mechanisms. To provide a substantially lower steering ratio in the areas of steering operation ordinarily used in parking and similar maneuvers would render the vehicle extremely difficult to maneuver, especially for women or other persons having less than average strength. By combining this variable steering ratio with a power boost apparatus, however, a steering system is provided in which the advantages of relatively direct, low steering ratio, steering for parking operations and the like are provided without requiring unusually great strength on the part of the operator during such low speed, high turn, maneuvers.

The above discussed combination of power steering and variable steering ratio which provides the substantially improved steering system forming an objective of the present invention, may be seen from a consideration of Figures 1 through 3. As is there shown, the arm 14 which is actuated manually through the cam follower 14a and the cam slot 13a in the manner above described, is likewise actuated at connecting pin 20 by means of a link 21 reciprocated by a piston 22 slidably mounted within cylinder 23. The link 21 is pivotally secured at its left hand end, as viewed in Figure 3, to a clevis pin 24 secured to the piston carrying member 25. The member 25 carries a tubular piston guide 26 which is slidably mounted in the housing 10 and sealing bulkhead 27, thereby maintaining the piston 22 in an accurately aligned, non-tilting, position throughout its travel. Fluid pressure is applied to the chambers 28 and 29 selectively by means of a control valve such as that shown at 35 in Figure 1. As may there be seen the housing 10 is provided with a cylindrical bore 36 in which the valve core 35 is slidably mounted. The core 35 is provided with a central annular groove 37 and a pair of annular exhaust grooves 38 and 39 adjacent thereto. Fluid under pressure is applied to the groove 37 by means of a conduit 40 leading to the output of a suitable pump. This fluid under pressure is directed to the annular grooves 41 and 42 in the housing 10 and, as may be seen, in the neutral condition the fluid flows from the grooves 41 and 42 into the respective exhaust grooves 38 and 39 and thence through bores 43 and 44 to an annular exhaust groove 45 in the housing 10, which latter groove leads through conduit 46 to the sump of the pump.

Upon reciprocation of the steering shaft 11 to the left, for example, as viewed in Figure 1, grooves 42 and 38 are closed off and fluid pressure is directed from groove 37 to annular groove 41 and from thence through conduit 47 to chamber 29 to actuate the arm 14 in the clockwise direction. Upon reciprocation of the steering shaft to the right as viewed in Figure 1, fluid pressure is directed to groove 42 and from thence through conduit 48 to chamber 28 to actuate the arm 14 in the counterclockwise direction.

Reciprocation of the control valve 35 is caused by reaction forces applied to the cam 13 as a result of the steering load. As may be seen from Figure 1, the worm 13, which is rigidly secured to the steering shaft 11, is rotatably carried in bearing 49 which comprises a pair of balanced Belleville centering springs 50 which carry races 51 and 52. Balls 53 cooperate with the races 51 and 52, and with the race 54 on the cam 13 to provide an anti-frictional rotational bearing. The springs 50 resist reciprocation of the cam 13 and thereby provide a force tending to return the steering wheel to its neutral straight-ahead condition.

It will thus be seen that I have provided a novel power steering system wherein a variable steering ratio, providing a steering characteristic shown in line A, Figure 4, is achieved. As compared with the conventional characteristic shown in line B, Figure 4, it will be noted that the steering ratio in the extreme positions of turn is actually substantially less than the steering ratio in the central, straight ahead position instead of being slightly more as in conventional prior art devices. This relationship, coupled with a power boost applied to the steering cross shaft, provides an unusually effective steering system in which the operator is provided with a relatively non-sensitive steering system in the straight ahead, highway driving, steering condition and with a very direct steering ratio in the conventional parking situation. In the present invention this is achieved through an extremely simple cam and cam follower structure combined with a simple power steering motor, thereby providing a power steering unit substantially superior to those known to the prior art and, at the same time, of minimum expense.

It will, of course, be apparent to those skilled in the art that variations and modifications may be made in the illustrated structure without departing from the scope of the novel concepts of the present invention. It is, accordingly, my intention that the scope of the present invention be limited solely by the appended claims.

I claim as my invention:

1. In a steering system for vehicles having a rotatable steering shaft and an oscillatable cross shaft connected to a steered part, a cam connection between said steering shaft and said cross shaft comprising a generally helical cam track on said steering shaft and extending from a central straight-ahead position to extreme positions on axially opposite sides of said central position and cam follower means operatively secured to said cross shaft and positively cooperating with said cam track whereby rotation of said steering shaft will cause angular oscillation of said cross shaft from a midpoint straight-ahead position to extreme points of maximum vehicle turns, said cam track having a low lead at its central portion providing at said central portion a conventional high steering ratio, a varying lead which increases rapidly as the track extends away from its central portion and a gradually more constant substantially higher lead as the cam track progresses further toward its extremities providing a rapidly decreasing steering ratio adjacent the straight-ahead vehicle condition and a decrease to a substantially lower steering ratio in the rate of ratio decrease before the cross shaft has rotated through an angle half as great as the angle of travel from straight-ahead position to an extreme position.

2. In a power steering system for vehicles having a rotatable steering shaft and an oscillatable cross shaft connected to a steered part, a power motor operatively connected to said steered part, a control valve for energizing said motor in response to the application of a steering load to said steering shaft when said shaft is rotated by a vehicle operator against a steering load, a cam connection between said steering shaft and said cross shaft comprising a generally helical cam track on said steering shaft and extending from a central straight-ahead position to extreme positions on axially opposite sides of said central position and cam follower means operatively secured to said cross shaft and positively co-operating with said cam track whereby rotation of said steering shaft will cause angular oscillation of said cross shaft from a midpoint straight-ahead position to extreme points of maximum vehicle turn, said cam track having a low lead at its central portion providing at said central portion a conventional high steering ratio, a varying lead which increases rapidly as the track extends away from its central portion and a gradually more constant substantially higher lead as the cam track progresses further toward its extremities providing a rapidly decreasing steering ratio adjacent the straight-ahead vehicle condition and a decrease in the rate of ratio decrease, substantially before the cross shaft has rotated to its extreme position to a substantially lower steering ratio.

3. In a steering system for vehicles having a rotatable steering shaft and an oscillatable cross shaft connected to a steered part, a cam connection between said steering shaft and said cross shaft comprising a generally helical cam track on said steering shaft, and cam follower means operatively secured to said cross shaft and co-operating with said cam track whereby rotation of said steering shaft will cause oscillation of said cross shaft, said cam track having a variable lead and said follower positively co-operating therewith and being adapted to move from a neutral straight-ahead condition in which said follower engages said cam track at a portion of the cam track of minimum low lead and high ratio to positions deviating from neutral in which said follower engages said cam track at a portion of increasing lead, the lead at said portion of engagement increasing rapidly adjacent the neutral straight-ahead condition for a portion of its travel and then increasing at a substantially reduced rate upon further movement away from the straight-ahead condition to a substantially reduced ratio whereby rapid over-all change in steering ratio is provided adjacent the vehicle straight-ahead condition and a substantially lesser change in ratio is provided at the vehicle parking range of operation.

4. In a power steering system for vehicles having a manually rotatable steering shaft and an oscillatable cross shaft connected to a steered part, a power motor operatively connected to said steered part, a lost motion connection between said steering shaft and the steered part providing lost motion therebetween upon the application of steering torques to said manual shaft in either direction of rotation thereof to steer said steered part, a valve, means operable upon the occurrence of said lost motion to actuate said valve to energize said power motor to move said steered part, a variable ratio cam connection between said steering shaft and said cross shaft comprising a generally helical cam track on said steering shaft, and cam follower means operatively secured to said cross shaft and co-operating with said cam track whereby rotation of said steering shaft will cause oscillation of said cross shaft, said cam track having a variable lead and said follower positively co-operating therewith and being adapted to move from a neutral straight-ahead condition in which said follower engages said cam track at a portion of the cam track of minimum low lead and high ratio to positions deviating from neutral in which said follower engages said cam track at a portion of increasing lead, the lead at said portion of engagement increasing rapidly adjacent the neutral straight-ahead condition for a portion of its travel and then increasing at a substantially reduced rate upon further movement away from the straight-ahead condition to a substantially reduced ratio whereby rapid over-all change in steering ratio is provided adjacent the vehicle straight-ahead condition and a substantially lesser change in ratio is provided at the vehicle parking range of operation.

References Cited in the file of this patent

UNITED STATES PATENTS

| | | |
|---|---|---|
| 1,567,997 | Ross | Dec. 29, 1925 |
| 1,584,629 | Marles | May 11, 1926 |
| 2,410,049 | Davis | Oct. 29, 1946 |
| 2,587,495 | MacDuff | Feb. 26, 1952 |
| 2,619,417 | Cochrane | Nov. 25, 1952 |
| 2,682,778 | Creson et al. | July 6, 1954 |